July 26, 1938. R. R. COWEN ET AL 2,125,001

MANUFACTURE OF RUBBER TUBING

Filed Aug. 13, 1937

Inventors
RAWSON R. COWEN AND CYRIL L. SILVIA
by Thomson & Thomson
their Attys.

Patented July 26, 1938

2,125,001

UNITED STATES PATENT OFFICE 2,125,001

MANUFACTURE OF RUBBER TUBING

Rawson R. Cowen and Cyril L. Silvia, Taunton, Mass., assignors to New Jersey Rubber Company, Taunton, Mass., a corporation of Massachusetts Application August 13, 1937, Serial No. 158,936

7 Claims. (Cl. 18—53)

This invention relates to the manufacture of extruded rubber tubing, and pertains more particularly to improvements in the method of receiving the extruded rubber as it is projected from the ordinary tubing machine and transferring it to the usual vulcanizing drum. The improved process is especially advantageous in the production of thin-walled tubing made of a relatively high grade rubber compound or tubing which is channeled or irregular in cross-section, such as that employed as a cushion or weather stripping around the doors or trunk lids of automobiles.

It is extremely difficult if not impossible to handle or manipulate such tubing, as it is extruded in an uncured state from the nose of the tuber, without deforming or collapsing the soft and sticky rubber before it is placed in the vulcanizer; for any appreciable tension or compression of the uncured rubber will cause the walls of the tubing to stick together or will produce a permanent distortion thereof. Various measures have been tried, including the blowing of talc into the interior of the tubing and the application of water to its exterior, in an effort to solve this difficulty; but these expedients have not been successful because, although they offset the stickiness or tackiness of the tubing to some extent, they do not avoid the likelihood of distortion or mutilation resulting from the necessary handling of the uncured tubing.

Hence, it is the primary purpose of the present invention to provide a method which will reduce to a minimum, if not completely eliminate any objectionable handling of the uncured tubing from the time it leaves the tubes until it is placed in the vulcanizer, and which will thus ensure that the vulcanized tubing retains the same undistorted shape in which it was extruded from the die of the tubing machine.

This purpose is accomplished by extruding the tubing into a trough of water so that it is "floated" through the trough thereby exposing both its outer and inner surfaces to the partial-setting and tack-removing action of the water bath; then breaking off the tubing to provide a strip of the desired length, and placing the strip upon a form deposited on the bottom of the trough and constructed to support the tubing against collapse of its main walls or channeled portions; and finally lifting the form with the strip of tubing thereon and depositing it with other forms and strips upon a tray or carrier which is then placed in the vulcanizing drum to cure the several strips.

The extruding die is preferably vented to the atmosphere through the nose of the tuber so that there will be no air resistance to the admission of water into the tubing as it progresses through the trough in the form of a stream; and a portion of the water which fills the bore of the tubing strip while in the trough is preferably retained in the tubing when it is removed from the water bath and placed on the carrier for vulcanization. The air vent not only allows the water to fill the tubing and partially set its interior surface, but also prevents bulging of the rubber by trapped air and overcomes the tendency of air-filled tubing to float above the surface of the water; and the small quantity of water retained in the tubing assists the curing of the rubber in the vulcanizer.

Although the extruded tubing may be, and preferably is, guided through the trough by the attendant (preferably wearing rubber gloves) who is ready to break the stream into strips, and onto the forms by other workmen, such guidance exerts no appreciable tension or compression on the tubing, and there is no handling of the rubber until it has been immersed in the water and become partially set. Furthermore, the partially-set, uncured tubing is floated onto the submerged form where it assumes its proper position for curing or vulcanization, before it is taken from the water bath; and that position is not disturbed when the supporting form is lifted from the water and transferred to the vulcanizing tray and into the curing drum, for the tubing itself need not be handled and is not subjected to any appreciable strain or distortion after it has been placed in curing position on the submerged form.

Hence, there is no deformation of the walls or channeled flanges of the tubing prior to vulcanization except possibly at the broken ends of strips which may be cut off after vulcanization; and the inconvenience of using talc to offset the tack of the rubber is entirely obviated. The vulcanized strips are therefore uniform in cross-section throughout their lengths and the shape formed by the extruding die is preserved in the finished article, without the waste of material or loss of time which otherwise would result from damage or distortion of the rubber.

Apparatus suitable for use in practicing this invention is illustrated in the accompanying drawing, in which.

Figure 1:
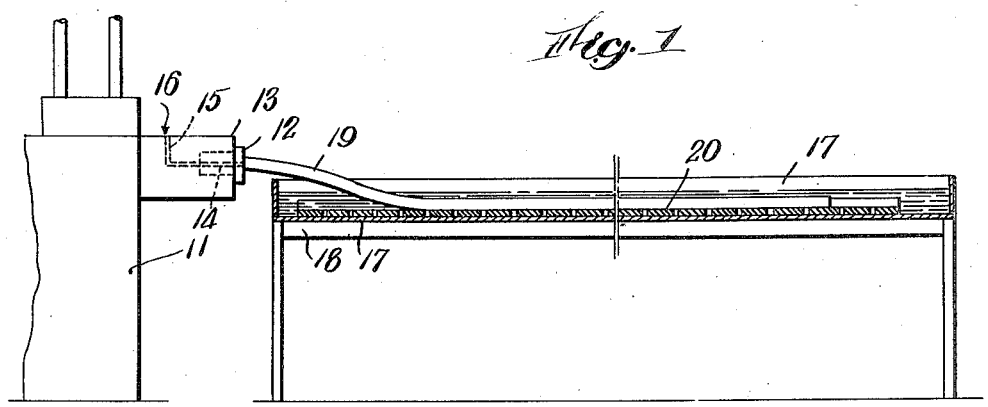
Fig. 1 is a diagrammatic elevation, partly in section, of an extruding machine feeding rubber tubing into a trough of water and onto a submerged supporting form.
Figure 2:
Fig. 2 is a similar view showing the form and tubing removed from the trough and placed upon a supporting tray or carrier.
Figure 3:
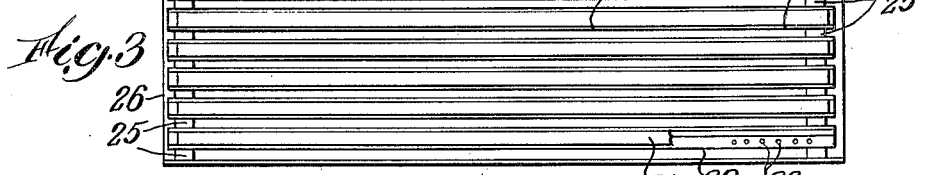
Fig. 3 is a plan view of a tray holding several of the forms with the tubing strips thereon, one of the strips being partly broken away.

The tuber 11 may be of any known construction suitable for heating the rubber compound and extruding it through the die 12 in its nose 13. In accordance with this invention, the die preferably has a central opening 14 communicating with a duct 15 in the nose, the duct being vented to the atmosphere as at 16.

A trough of water 17 mounted on a table 18 or other support adjacent the tubing machine 11 receives the extruded tubing 19 fed from the die as a continuous stream. The water is kept relatively cool, and soap may be added if desired. One or more forms 20, preferably of flexible material such as vulcanized rubber, are placed in the trough, to receive and support the strips of tubing 21 which are broken or cut from the stream 19, the strips being guided onto the forms while both are under water. The upper surfaces of said forms are shaped to support the particular configuration of the tubing strips in such a manner that the soft rubber walls or channeled portions thereof will not collapse when removed from the water.

Figure 5:
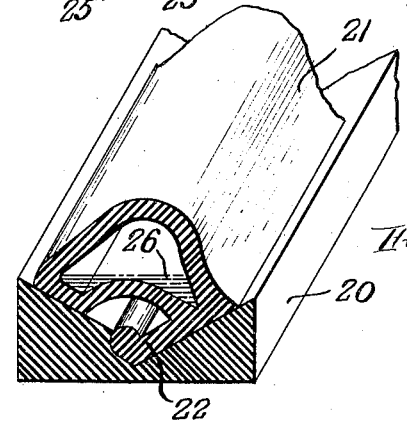
Fig. 5 is a section on line 5—5 of Fig. 4.
Figure 6:
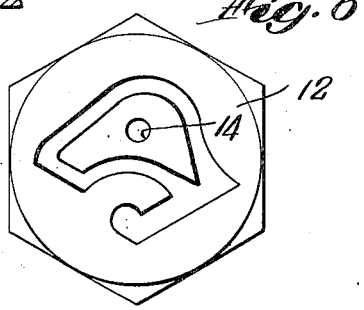
Fig. 6 is a front view of a die used for extruding tubing shaped as shown in Fig. 5.

As shown in Fig. 5, for example, the supporting surface of the form 20 is grooved and substantially V-shaped in cross-section, the walls and arched portions of the body of the strip 21 being supported by the sides of the groove and the channeled flange 22 at the bottom of the groove. Openings 23 are preferably formed in the bottom of the forms 20 so that water may drain therethrough while the forms are on the tray or rack about to be described.

Figure 4:
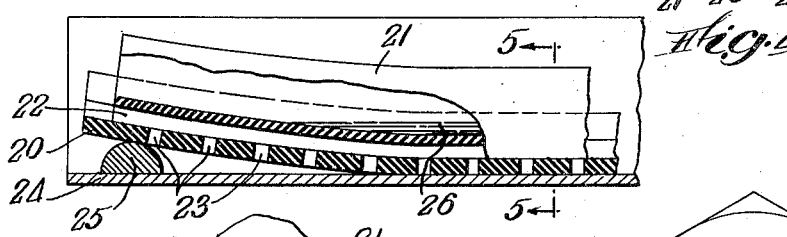
Fig. 4 is a section on line 4—4 of Fig. 3.

As each form and its supported tubing strip is removed from the water bath, it is placed upon a rigid tray 24 (suitably supported near the trough) along with other forms; and the tray preferably has cross bars 25 at either end which elevate the ends of the forms and their tubing strips. This serves to prevent the escape of the small quantity of water which is preferably retained in the tubing during vulcanization and which is indicated at 26 in Figs. 4 and 5, while permitting excess water to drain through the holes 23 in the bottoms of the forms. The latter are shown at spaced intervals along the length of the forms, but the number and location thereof is optional.

As soon as the tray is filled, it is ready to be placed in a suitable vulcanizer, and the strips are then cured in the usual way. After vulcanization, the strips are removed from the forms, and the latter are placed back in the trough to receive another group of uncured strips, the process being continuous so long as the extruding machine is operating.

It will be understood that the structural details of the apparatus herein described may be varied as desired to suit particular conditions without departing from the essence of the invention defined in the following claims. The practice of this invention not only results in the production of tubing strips which are more uniform in structure and commercially satisfactory than those heretofore produced, but also affords substantial economies in time, labor and materials, especially in connection with the manufacture of relatively delicate tubing sections of high grade rubber or channeled shapes of the type herein illustrated.

The practice of the invention herein disclosed affords a simple, practical, efficient and economical method of making extruded rubber tubing, and substantially improves the resulting product because the uncured tubing is placed in curing position upon its supporting form while immersed in water, and is not subjected to shape-distorting stresses or strains from the time it leaves the tubing machine until it is cured in the vulcanizer.

We claim:

1. A method of making extruded rubber tubing, which consists in extruding the tubing into a liquid bath, severing a strip of uncured tubing from the stream projected from the extruder, floating the strip into curing position on a submerged supporting form, removing the form and supported strip by lifting the form from the bath, and vulcanizing the tubing strip while on the form.

2. A method of making extruded rubber tubing, which consists in feeding the tubing into a liquid bath from the die of an extruding machine, venting the air within the extruding tubing through the die to the atmosphere, so that the liquid substantially fills the tubing as it is fed into the bath, placing the tubing upon a submerged supporting form, and removing the form and supported tubing from the bath for vulcanization.

3. A method of making extruded rubber tubing, which consists in feeding the uncured tubing projected from the die of an extruding machine into a liquid bath so that the tubing is substantially immersed in and filled with the liquid, severing the extruded tubing into strips while it is in the bath, guiding a strip of tubing onto a supporting form located in the bath, removing the form from the bath with tubing strip thereon, and vulcanizing the tubing while on the form.

4. A method of making extruded rubber tubing, which consists in feeding the uncured tubing projected from the die of an extruding machine into a liquid bath so that the tubing is substantially immersed in and filled with the liquid, severing the extruded tubing into strips while it is in the bath, guiding a strip of tubing onto a supporting form located in the bath, removing the form from the bath with tubing strip thereon while retaining some of the liquid within the strip, placing the form on a carrier and supporting its ends in elevated position to trap the water therein, and then vulcanizing the tubing on the form thus supported.

5. A method of making extruded rubber tubing, which consists in feeding the uncured tubing projected from the die of an extruding machine into a liquid bath so that the tubing is substantially immersed in and filled with the liquid, severing the extruded tubing into strips while it is in the bath, guiding a strip of tubing onto a supporting form located in the bath, removing the form from the bath with tubing strip thereon while retaining some of the liquid within the strip, placing the form on a carrier and supporting its ends in elevated position to trap the water therein, causing excess water to drain from the forms and then vulcanizing the tubing on the form thus supported by the carrier.

6. A method of making extruded rubber tubing, which consists in feeding the uncured tubing projected from the die of an extruding machine into a liquid bath so that the tubing is substantially immersed in the liquid, venting the air within the tubing through the die to the atmosphere so that the liquid substantially fills the tubing, severing the immersed tubing into strips, placing a severed strip on a supporting form located in the bath, and removing the form from the liquid, with the tubing strip thereon, for vulcanization.

7. A method of making extruded rubber tubing, which consists in feeding the uncured tubing projected from the die of an extruding machine into a liquid bath so that the tubing is substantially immersed in the liquid, venting the air within the tubing through the die to the atmosphere so that the liquid substantially fills the tubing, severing the immersed tubing into strips, placing a severed strip on a supporting form located in the bath, transferring the form with the tubing strip thereon from the bath to a carrier and supporting its ends in elevated position thereon, to retain a portion of the liquid within the tubing, and then placing the carrier, form and tubing in a vulcanizer.

RAWSON R. COWEN.
CYRIL L. SILVIA.